United States Patent [19]
Berk et al.

[11] 3,812,513
[45] May 21, 1974

[54] PHOTOGRAPHIC SHUTTER

[75] Inventors: Walter E. Berk, Roselle; Gregory H. Kulykivsky, Park Ridge, both of Ill.

[73] Assignee: Bell & Howell Company, Chicago, Ill.

[22] Filed: Nov. 15, 1972

[21] Appl. No.: 306,642

[52] U.S. Cl.............................. 95/53 R, 95/57, 95/59
[51] Int. Cl............................. G03b 9/16, G03b 9/36
[58] Field of Search ........... 95/53 R, 53 EA, 53 EB, 95/57, 59

[56] References Cited
UNITED STATES PATENTS

| | | | |
|---|---|---|---|
| 2,728,279 | 12/1955 | Gebele | 95/57 X |
| 3,545,352 | 12/1970 | Bellows | 95/60 X |
| 3,709,134 | 1/1973 | Kital | 95/60 |
| 3,572,231 | 3/1971 | Ort | 95/57 |
| 2,541,413 | 2/1951 | Gorey | 95/53 R |
| 2,938,425 | 5/1960 | Lopey-Henriquez | 95/57 X |

*Primary Examiner*—Joseph F. Peters, Jr.
*Attorney, Agent, or Firm*—John E. Peele, Jr.; Roger M. Fitz-Gerald

[57] ABSTRACT

A shutter apparatus and method of operating the same in a camera having an objective lens through which light rays may enter the camera. The shutter apparatus includes the combination of reciprocable shutter curtain having an exposure aperture movable to a film exposure position, and a shutter blade in juxtaposition to the shutter curtain and movable in timed relationship after the curtain is moved to cut-off exposure through the curtain's exposure aperture. In a mirror reflex camera, the mirror is moved out of the path of the light rays prior to moving the shutter curtain. The shutter curtain and shutter blade have engaging surfaces whereby they may be simultaneously returned to their cocked positions after an exposure.

12 Claims, 9 Drawing Figures

PHOTOGRAPHIC SHUTTER

BACKGROUND AND SUMMARY OF THE INVENTION

This invention relates to photographic equipment and, more particularly, to a shutter assembly for a camera wherein components of the shutter assembly are arranged in the vicinity of the focal plane to move generally parallel with that plane.

Various types of shutter mechanisms are known for use in cameras where the shutter components travel in the vicinity of the focal plane. One form of known shutter mechanism includes a pair of generally rigid shutter blades which are mounted on guiding shafts, or the like, and biased in a given direction by spring means. One of the blades has a cut-out forming an exposure aperture, which is blocked after a predetermined exposure time, by the second rigid blade moving generally parallel and in juxtaposition to the cut-out blade. Another type of shutter mechanism employs a flexible curtain which is wound about a pair of spaced rollers, one of the rollers being spring loaded to effect movement of the curtain in response to actuation of a release mechanism. The flexible curtain has a cut-out or slit which is movable across the path of light rays entering the camera through the objective lens thereof.

The present invention is directed to providing a new and improved shutter mechanism for use with photographic equipment such as cameras, or the like, of the character described.

An object of the present invention, therefore, is to provide a new and improved shutter mechanism for photographic equipment.

Another object of the invention is to provide a shutter mechanism which employs the combination of a flexible shutter curtain having an exposure aperture operatively associated with and used in conjunction with an exposure cut-off shutter blade.

The shutter mechanism of the present invention is designed for use in photographic equipment, such as a camera having an objective lens through which light rays may enter to impinge on film in the camera. The shutter mechanism includes, in combination, a reciprocable shutter curtain movable across the path of light rays entering the objective lens. An exposure aperture is formed in the curtain and is movable to an exposure position to permit the light rays to pass through the curtain. A generally rigid shutter blade is positioned in juxtaposition to the shutter curtain and is movable generally parallel thereto from a stored position to a cut-off position in the path of the light rays where it blocks the exposure aperture in the shutter curtain after a period of time. To initiate an exposure, means is provided for releasing the shutter curtain to move the exposure aperture from its cocked position to its exposure position. Another means is provided for releasing the shutter blade after a period of time to move the same from its stored to its exposure aperture blocking position to terminate the exposure. Abutment surfaces are provided on the shutter curtain to cooperate with the shutter blade to return the blade to its stored position simultaneously with the return of the curtain from its exposure position.

In the method of the present invention, the shutter curtain first is released so as to move its exposure aperture to the exposure position. The shutter blade then is moved after a predetermined exposure time to its cut-off position. In mirror reflex cameras, the mirror is moved out of the path of the light rays prior to moving the shutter curtain, from a viewing position to reflect the light rays to an appropriate view finder arrangement to an exposure position where the mirrir is out of the path of the light rays.

In the embodiment of the invention shown herein, a solenoid is provided to hold the shutter blade in its stored position for a period of time after the shutter curtain is released. When the shutter curtain is released, the solenoid is simultaneously activated to hold the blade. Thereafter, the solenoid is then de-activated after the exposure period to release the blade to terminate the exposure.

Other objects, features and advantages of the invention will be apparent from the following detailed description taken in connection with the accompanying drawings.

DESCRIPTION OF THE ILLUSTRATED EMBODIMENT

Figure 1:
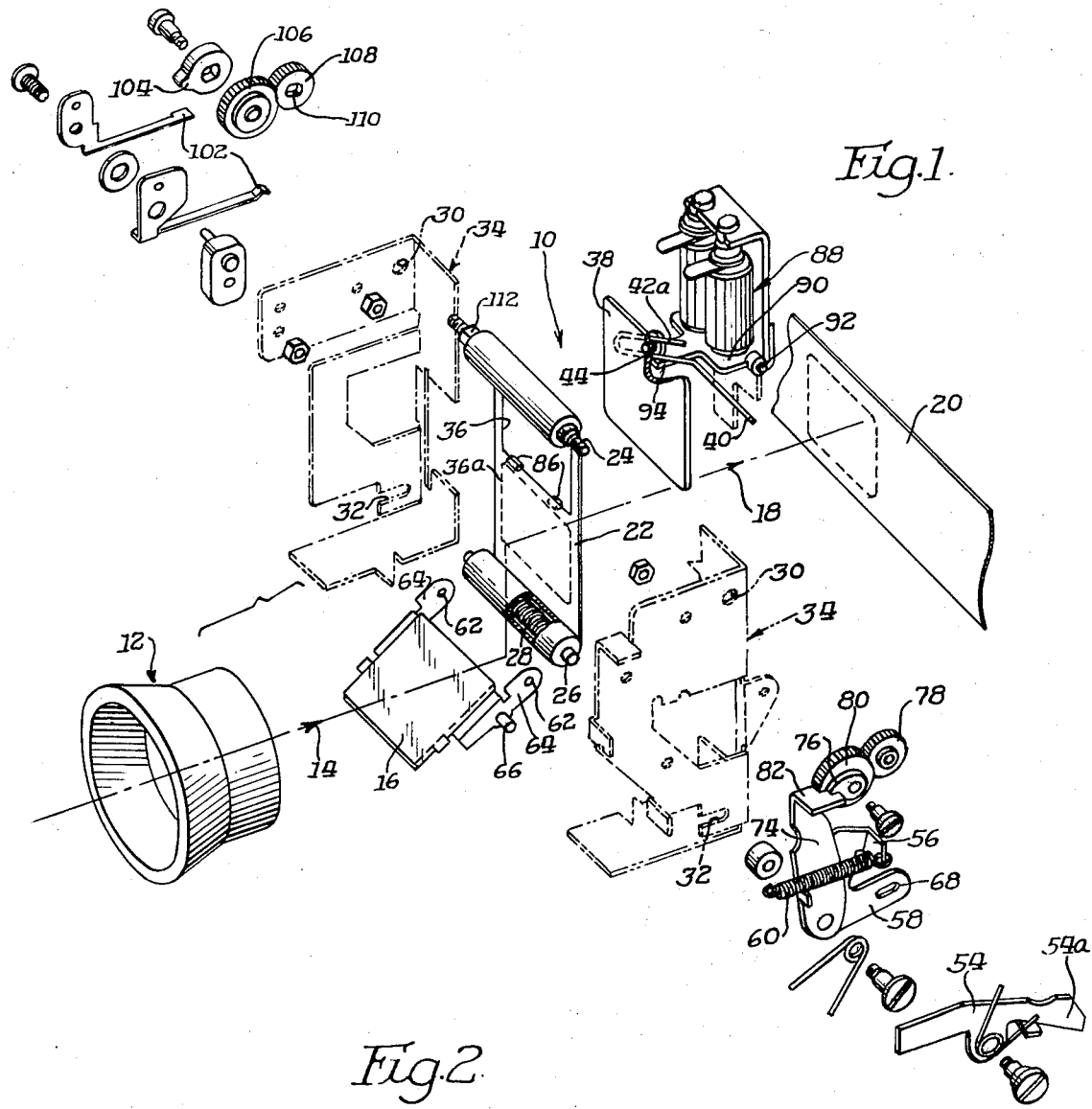
FIG. 1 is an exploded perspective view of the shutter mechanism of the present invention in conjunction with certain of the release components therefor, along with certain associated components of a camera shown somewhat schematically.
Figure 2:
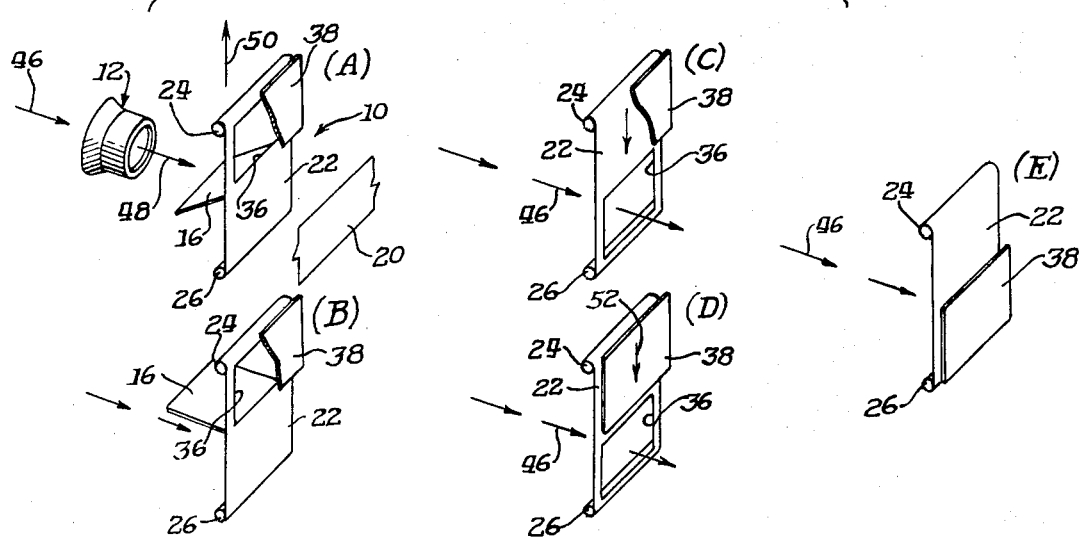
FIGS. 2(A)-(E) are somewhat schematic perspective views illustrating the sequence of operation of the components of the shutter mechanism of the present invention.

Referring to the drawings in greater detail, and first to FIGS. 1 and 2, the shutter mechanism, generally designated 10, is adapted for use in photographic equipment such as cameras, having an objective lens generally designated 12, through which light rays may enter the camera generally in the direction of arrowhead 14. In a mirror reflex camera, the light rays will be directed onto a mirror 16 which is movable into and out of the path of the light rays. When the mirror is in the path of the light rays, the rays are reflected to an appropriate view finder arrangement, not shown in the drawings. When the mirror is moved out of the path of the light rays, the light rays pass toward the shutter mechanism 10 and, when the shutter mechanism is in exposure condition, the rays will be directed in the direction of arrowhead 18 onto a film strip 20 for exposure purposes.

The shutter mechanism of the present invention comprises a reciprocable shutter curtain 22 which is movable across the path of light rays entering the objective lens 12. The shutter curtain, preferably of an opaque and flexible fabric, is wound about an upper roller 24 and a lower roller 26 which is loaded with a coil spring 28 by which the velocity of the curtain is adjustable. The rollers 24 and 26 are journalled in apertures 30 and slots 32, respectively, of appropriate camera frame components, generally designated 34 and shown in phantom in FIG. 1. The shutter curtain 22 has a cut-out exposure aperture 36 which is movable with the curtain 22 from a cocked position shown in full lines in FIG. 1, to an exposure position shown by the dotted lines 36a in FIG. 1 where light rays are permitted to pass through the curtain 22 from the objective lens 12 when the mirror 16 is out of the path of the light rays.

The shutter mechanism 10 includes an opaque shutter blade 38 which is preferably of rigid plate like construction. The blade is mounted in juxtaposition behind the curtain 22 and is movable from a cocked or stored position shown in FIG. 1 to an exposure cut-off position in the path of the light rays where the shutter blade blocks the exposure aperture 36 in the shutter curtain 22 when the aperture is in the exposure position shown by the dotted lines 36a (FIG. 1). The shutter blade 38 is mounted to appropriate framework of the camera to be guided for reciprocation along a determined path. By means of a spring rod 40 having a hook portion 42a wrapped about a boss member 44 secured to the shutter blade, the blade is biased toward the exposure cut-off position with its velocity being adjustable by positioning the end of the spring.

The sequence or method of operation of the shutter mechanism of the present invention is shown best in FIGS. 2(A) through 2(E). More particularly, FIG. 2(A) shows the initial position of the components permitting a user of the camera to view his subject and make appropriate settings for the camera. Here the light rays 46 enter the camera through the objective lens 12, as at 48, and are reflected by the mirror 16 upwardly, as at 50, to an appropriate view finder arrangement (not shown). In this figure the shutter curtain 22 and shutter blade 38 both are in their raised and cocked positions. Operation of the shutter mechanism is initiated upon actuation of the camera shutter relase button, not shown, and by means described in greater detail hereinafter. First, the mirror 16 is raised to the exposure position as shown in FIG. 2(B) wherein the mirror is out of the path of the light rays entering the objective lens 12. Next, the shutter curtain is released so as to be wound up by the spring loaded roller 26 whereupon the exposure aperture 36 is moved to its exposure position as shown in FIG. 2(C) to permit the light rays to pass through the exposure aperture. From an instant prior to curtain release and through the period of this movement, the shutter blade 38 is held in its cocked position as shown in FIG. 2(C). Thereafter, the shutter blade 38 is released so that it moves from its cocked position in the direction of arrow 52 in FIG. 2(D) until it is moved completely to its blocking position shown in FIG. 2(E). In this position, the blade blocks the exposure aperture in the shutter curtain and thereby prevents the light rays from further exposing the film. By means to be described hereinafter in greater detail, the shutter curtain and shutter blade are returned together to their cocked positions shown in FIG. 2(A) with the blade remaining in blocking condition relative to the exposure aperture in the curtain.

Figure 5:
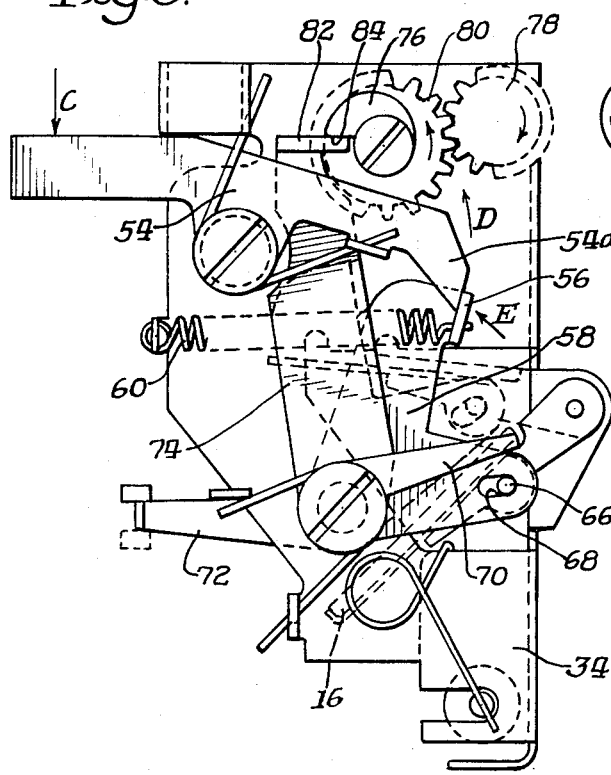
FIG. 5 is an elevational view of certain of the mirror and shutter curtain release components of the present invention.

The means for releasing the shutter curtain 22 is shown in elevation in FIG. 5, certain components of which are shown in perspective in FIG. 1. As stated above, operation of the mechanism is initiated upon actuation of the camera's shutter release button. The shutter release button actuates a release lever 54, as by depressing the lefthand end of the lever (as viewed in FIG. 5) downward in the direction of arrow C. Upon actuation, the opposite end 54a of the lever 54 is moved upwardly in the direction of arrow D (FIG. 5) until it is moved out from behind a lug 56 of a mirror drive lever 58. The mirror drive lever then moves counterclockwise in the direction of arrow E under the influence of a mirror lift spring 60. The mirror 16 is pivoted to the frame members 34 by appropriate means protruding through apertures 62 (FIG. 1) in the ends of pivot support arms 64 to which the mirror is fixed. A pin 66 protrudes from the side of one of the mirror support arms and is received in an elongated slot 68 (FIG. 5) in the mirror drive lever 58. Thus, as the drive lever 58 rotates in the direction of arrow E, the mirror is lifted out of the path of the light rays to its exposure position.

As seen in FIG. 5, the pin 66, fixed to one of the mirror support arms 64, engages one arm 70 of a double-armed control lever upon movement of the mirror from a viewing position to an exposure position. As the pin moves arm 70 of the control lever, the other arm 72 thereof adjusts various components of the camera, such as adjusting the lens diaphragm to a predetermined opening.

In addition to lifting the mirror 16, the mirror drive lever 58 is moved by the drive spring 60 to engage a shutter release lever 74. The shutter release lever 74 is retained by a cam 76 which is rotatably driven by the shutter curtain roller 24, through gears 78 and 80, when the shutter curtain is wrapped about the spring loaded roller 26 to which its other end is attached. A tab 82 on the shutter release lever 74 extends into the path of a stop surface 84 on the cam 76. The stop surface permits the cam to rotate when the tab 82 moves out of the path of the stop surface 84, until the cam rotates to bring the stop surface back into engagement with the cam 82. The shutter release lever 74 is held at its cam release position only for an instant immediately following movement of the mirror to its exposure position, upon actuation of the camera's shutter release button.

Referring back to FIG. 1, the shutter blade 38 is held in its cocked position by the shutter curtain 22 until the shutter curtain is released to initiate an exposure sequence. More particularly, a pair of tabs 86 are provided on the backside of the shutter curtain below the exposure aperture 36. The shutter blade, which rests with its lower edge on the tabs 86, is constantly urged downwardly under the force of spring rod 40. Hence, until the curtain is released, the shutter blade is restrained by the tabs against inadvertent movement. However, once the shutter curtain 22 is released to move its exposure aperture 36 to the film exposure position, the shutter blade 38 must be held upwardly against the biasing of spring rod 40 for the period of film exposure.

To restrain the shutter blade 38 in cocked position, after shutter release, solenoid means, generally designated 88, cooperates with a plate member 90 pivoted about a pin axis 92 below the solenoid means 88. The plate member 90 has a tongue portion 94 which is positionable, when the plate is in the horizontal position shown in FIG. 1, under the boss member 44 secured to the shutter blade. When the solenoid means 88 is energized, the plate 90 will be held upwardly under the magnetic force created by the magnetic field of the solenoid means to hold the shutter plate 38 upwardly. When the solenoid means is de-energized, the plate 90 will pivot about axis 92 to its lower position permitting the shutter blade 38 to move under the biasing of spring rod 40 to cut off the light rays passing through the exposure aperture 36 in the shutter curtain.

Figure 3:
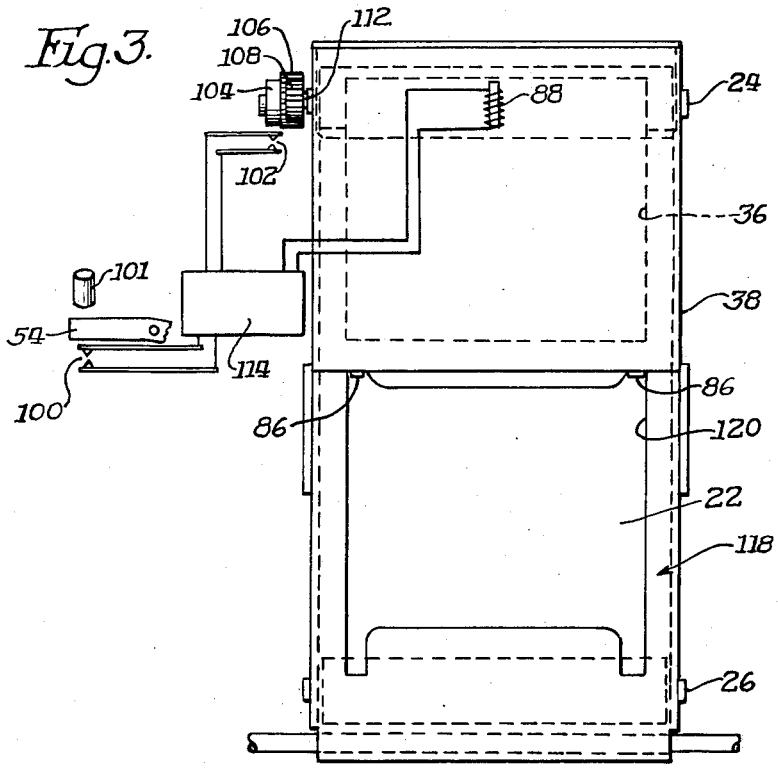
FIG. 3 is an elevational view, on an enlarged scale, of the shutter mechanism of the present invention, with the shutter curtain and shutter blade in their cocked positions.

To energize the solenoid means 88 at a predetermined instant relative to the time the shutter curtain 22 is released, a holding circuit switch means or contact pair 100, is actuated in response to actuation of the camera control button, shown schematically in FIG. 3 as 101. When the control button is actuated, the lever 54 releases the mirror to begin to lift and clear the exposure aperture. An instant before the mirror reaches its up position, the circuit is completed through the contact pair 100 to energize the solenoid 88 before the curtain moves from the shutter blade retaining position. Alternatively, a portion of the mirror may be adapted to close the contact pair 100 as the upward movement of the mirror begins. By this holding circuit contact pair, the solenoid means 88 is energized to restrain the shutter blade against movement when the curtain begins its downward movement and releases the blade to follow under the influence of biasing spring 40.

To prevent undue wasting of the power source and not off the solenoid energizing circuit, another contact pair 102 is arranged for actuation by a cam 104. As seen in FIG. 1, the cam is driven by small gears 106,108 which are coupled to the upper shutter curtain roller 24.

Small gear 108 has a key way 110 by which it is maintained on a key portion 112 of the upper shutter curtain roller 24 so as to rotate the cam 104 into engagement with contact pair 102 as the curtain moves toward an aperture open, film exposing condition, the cam is arranged to de-energize the circuit after the shortest interval or shutter speed at which the shutter might be adjusted. Hence, the solenoid energizing circuit would be de-energized instantly to release the shutter blade 38 as the cam 104 engages the contact pair 102, but for the exposure control/timing circuit, shown schematically at 114. Simultaneously, with de-energizing the solenoid, the timing of the overriding timing circuit is initiated. Depending on the quantity of light required for proper film exposure, the timing circuit terminates energization of the solenoid holding circuit after a time segment. Thereafter the blade is released to follow the curtain and end the exposure. Although a capacitive type of circuit is proposed as the timing circuit, other types of electrical, mechanical, or electro-mechanical variable time delay holding means may be employed in conjunction with the solenoid to determine the holding time for the shutter blade 38.

Following the operational sequence of the shutter mechanism during an exposure, the shutter curtain and the shutter blade are in the relative positions as shown in FIG. 2(E). To reset these shutter components to their cocked position for another exposure, a not shown drive winds the shutter curtain about roller 24. As the curtain is wound to retract the exposure aperture 36 back to a cocked position, the tabs 86 along the edge of the exposure aperture engage the shutter blade 38 to return the blade to its cocked position to await the start of another exposure sequence.

Figure 4:
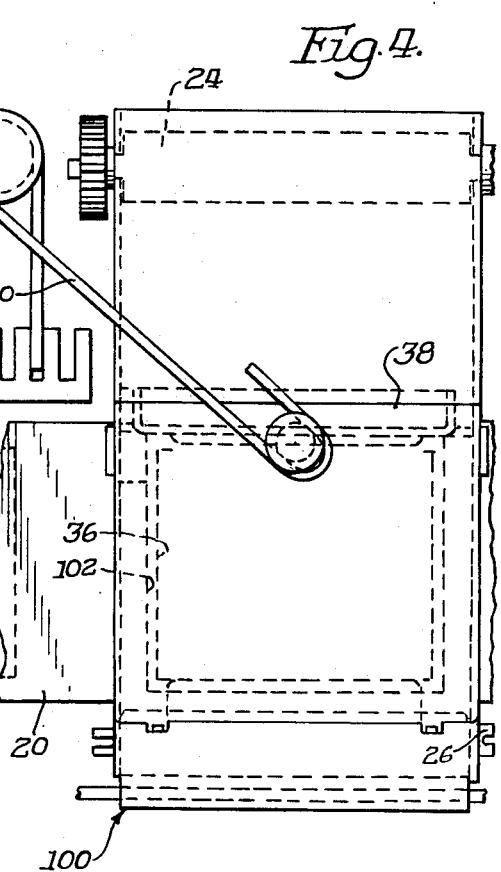
FIG. 4 is an elevational view similar to that of FIG. 3 with the shutter curtain moved to its exposure position and the shutter blade moved to its exposure cut-off position.

FIG. 3 shows the shutter curtain 22 and shutter blade 38 in their cocked positions in relation to appropriate surrounding frame portions, generally designated 118, of a camera or the like. The frame portion 118 has an aperture 120 which is closed by the curtain 22 in FIG. 3, with the exposure aperture 36 in cocked position. The tabs 86 engaging the underside of the shutter blade are shown. FIG. 4 shows the shutter curtain moved to its exposure position, with the spring rod 40 having moved the shutter blade 38 to its exposure blocking position.

The foregoing description has been given for clearness of understanding only and no unnecessary limitations should be understood therefrom as some modifications will be obvious to those skilled in the art.

What is claimed is:

1. In a camera having an objective lens through which light rays may enter the camera, a shutter means comprising:
   a reciprocable shutter curtain movable across the path of light rays entering said objective lens, with an exposure aperture movable from a cocked position to an exposure position to permit the light rays to pass through the curtain;
   means for releasing said shutter curtain to move the exposure aperture to its exposure position;
   a shutter blade in juxtaposition to said shutter curtain and movable from a cocked position to an exposure cut-off position in said shutter curtain when said curtain is in said exposure position;
   means for releasing the shutter blade to move the same from its stored to its aperture blocking position; and
   means for returning said shutter curtain back from its exposure position to its cocked position, and means for moving said shutter blade from its blocking position to its cocked position automatically in response to said returning of said shutter curtain.

2. The shutter means of claim 1 wherein said shutter blade is mounted for movement in a path parallel to the path of movement of said shutter curtain.

3. The shutter means of claim 1 wherein said shutter curtain is wound about a pair of spaced rollers one of which is a spring loaded roller which moves the curtain in response to actuation of said release means therefor.

4. The shutter means of claim 1 including solenoid means to hold said shutter blade in its cocked position a period of time after said shutter curtain is released.

5. The shutter means of claim 4 wherein said shutter curtain is wound about a pair of spaced rollers one of which is a spring loaded roller which moves the curtain in response to actuation of said release means therefor.

6. In a camera having an objective lens through which light rays may enter into the camera, a reciprocable shutter curtain with an exposure aperture movable across the path of light rays entering said objective lens, and a shutter blade in juxtaposition to said shutter curtain, the method comprising the steps of:
   moving said shutter curtain to cause said exposure aperture to move from a cocked position to an exposure position to permit the light rays to pass through the curtain;
   moving said shutter blade after moving said shutter curtain, from a cocked position to an exposure cut-off position in the path of said light rays where the shutter blade blocks the exposure aperture in said shutter curtain when in said exposure position; and the step of simultaneously moving said shutter curtain back from its exposure position to its cocked position and moving said shutter blade back from its blocking position to its stored position.

7. In a camera having an objective lens through which light rays may enter the camera, a shutter means comprising:
a reciprocable shutter curtain movable across the path of light rays entering said objective lens, with an exposure aperture movable from a cocked position to an exposure position to permit the light rays to pass through the curtain;
means for releasing said shutter curtain to move the exposure aperture to its exposure position;
a shutter blade in juxtaposition to said shutter curtain and movable from a cocked position to an exposure cut-off position in the path of said light rays to block the exposure aperture in said shutter curtain when said curtain is in said exposure position;
means for releasing the shutter blade to move the same from its stored to its aperture blocking positions; and
means for returning said shutter blade from its blocking position to its cocked position simultaneously with returning said shutter curtain back from its exposure position.

8. The shutter means of claim 7 wherein said shutter blade returning means comprises abutment means on said shutter curtain engageable with surface means on said shutter blade.

9. A shutter mechanism for use in a camera having an objective lens through which light rays may enter the camera,
said shutter mechanism comprising:
a single shutter curtain and a single shutter blade arranged immediately adjacent one another for parallel movement in immediately adjacent planes to establish a time segment during which entering light rays are passes and terminated solely by said curtain and blade;
said shutter curtain having therein an exposure aperture and being mounted for movement from a cocked position to an exposure position whereat the light rays pass through the exposure aperture in said curtain;
said shutter blade being mounted for movement from a cocked position to an exposure cut-off position in the path of said light rays for blocking the exposure aperture in said shutter curtain when said curtain is in said exposure position; and
means interconnecting said shutter curtain and said shutter blade for cooperative movement to release said shutter curtain and move said exposure aperture to its exposure position and thereafter to release the shutter blade to move the same from its cocked position to its aperture blocking position.

10. A shutter mechanism as in claim 9 including means on said shutter curtain for moving said shutter blade from its blocking position to its cocked position as said shutter curtain is returned to its cocked position.

11. A shutter mechanism for use in a camera having an objective lens through which light rays may enter the camera, the shutter mechanism comprising:
a reciprocable shutter curtain having an exposure aperture formed therein and being movable across the path of light rays entering said objective lens, said curtain being movable from a cocked position to an exposure position to permit light rays to pass through said exposure aperture;
means for releasing said shutter curtain to move said exposure aperture to its exposure position;
a substantially rigid opaque shutter blade arranged in juxtaposition with said shutter curtain and being movable from a cocked position to an exposure cut-off position in the path of said light rays to block light passing through the exposure aperture in said shutter curtain when said curtain is in said exposure position;
timing means for releasing the shutter blade for movement from the stored position to the aperture blocking position a time segment after said means releasing said shutter curtain is activated; and
means returning said shutter blade to the cocked position from the exposure aperture blocking position by physical engagement by said shutter curtain.

12. The shutter mechanism as in claim 11 wherein said releasing means includes means for restraining the shutter blade against movement for a time segment to enable proper film exposure.

* * * * *